(12) United States Patent
Stahler et al.

(10) Patent No.: US 9,645,332 B2
(45) Date of Patent: May 9, 2017

(54) IMPLANTABLE OPTICAL FEEDTHROUGH CONNECTOR

(71) Applicant: Circuit Therapeutics, Inc., Menlo Park, CA (US)

(72) Inventors: Greg Stahler, Belmont, CA (US); David Angeley, Charlottesville, VA (US); Brian Andrew Ellin, Sunnyvale, CA (US)

(73) Assignee: Circuit Therapeutics, Inc., Menlo Park, CA (US)

( * ) Notice: Subject to any disclaimer, the term of this patent is extended or adjusted under 35 U.S.C. 154(b) by 0 days.

(21) Appl. No.: 14/812,881

(22) Filed: Jul. 29, 2015

(65) Prior Publication Data

US 2016/0091680 A1    Mar. 31, 2016

Related U.S. Application Data

(60) Provisional application No. 62/030,446, filed on Jul. 29, 2014.

(51) Int. Cl.
*G02B 6/38* (2006.01)
*G02B 6/42* (2006.01)
*G02B 6/32* (2006.01)

(52) U.S. Cl.
CPC ............ *G02B 6/4248* (2013.01); *G02B 6/32* (2013.01); *G02B 6/3817* (2013.01);
(Continued)

(58) Field of Classification Search
CPC ...... G02B 6/32; G02B 6/3821; G02B 6/3817; G02B 6/4248
(Continued)

(56) References Cited

U.S. PATENT DOCUMENTS 4,166,668 A    9/1979   Macleod
4,752,109 A *  6/1988   Gordon ............... G02B 6/4204
                                                      257/712
(Continued)

FOREIGN PATENT DOCUMENTS

WO       2014/081449 A1    5/2014

OTHER PUBLICATIONS

"International Search Report and Written Opinion dated Nov. 19, 2015", International PCT Application No. PCT/US15/42732 with International Filing Date of Jul. 29, 2015, (9 pages).

*Primary Examiner* — Akm Enayet Ullah
(74) *Attorney, Agent, or Firm* — David C. Lundmark

(57) ABSTRACT

Configurations are described for creating and using separable optical feedthroughs. These are especially useful in their at least semi-hermetic form when integrated with implantable photomedical devices. One embodiment is directed to a system for operatively coupling an optical output from a light source positioned inside of a sealed housing to an external optical fiber, comprising: a first optical fiber disposed adjacent to the light source and configured to receive at least a portion of the optical output; a second optical fiber operatively coupled to the first optical fiber and configured to capture at least a portion of an output from the first optical fiber; a primary seal operatively coupled to the housing between the light source and the second optical fiber that is at least partially transparent; and a secondary seal positioned between the second optical fiber and the environment.

25 Claims, 5 Drawing Sheets

(52) U.S. Cl.
CPC .......... *G02B 6/3821* (2013.01); *G02B 6/3816* (2013.01); *G02B 6/4292* (2013.01)

(58) Field of Classification Search
USPC ............................................ 385/72–88, 147
See application file for complete search history.

(56) References Cited

U.S. PATENT DOCUMENTS

| | | | | |
|---|---|---|---|---|
| 4,997,279 | A | * | 3/1991 | Gordon ................ G02B 6/4204 356/153 |
| 5,210,815 | A | | 5/1993 | Alexander et al. |
| 6,290,382 | B1 | * | 9/2001 | Bourn ................ G01N 21/8806 362/294 |
| 6,360,039 | B1 | | 3/2002 | Bernard et al. |
| 6,485,191 | B1 | | 11/2002 | Sato |
| 2003/0010905 | A1 | * | 1/2003 | Luo ........................... G01J 1/04 250/227.11 |
| 2007/0041083 | A1 | * | 2/2007 | Di Teodoro ............ C03B 37/10 359/333 |
| 2007/0104431 | A1 | * | 5/2007 | Di Teodoro ....... G02B 6/02347 385/123 |

\* cited by examiner

IMPLANTABLE OPTICAL FEEDTHROUGH CONNECTOR

RELATED APPLICATION DATA

The present application claims priority to U.S. Provisional Application Ser. No. 62/030,446, filed Jul. 29, 2014. The foregoing application is hereby incorporated by reference into the present application in its entirety.

FIELD OF THE INVENTION

The present invention relates generally to systems, devices, and processes for optical feedthrough, and especially to hermetic optical feedthroughs for medical devices.

BACKGROUND

The ability to carry light from within a sealed enclosure to an illumination target is typically accomplished using a simple window or fiber optic coupler. However, these measures do not suffice to make the light source enclosure and the optical delivery means separable, and nominally hermetically sealed once joined, such as may be desired in an implantable medical device. Such implantable medical devices may be of use in photomedical and optogenetic therapies. Such systems are also described in International Appl. No. PCT/US2013/000262, which shares at least one inventor in common with the present application, and is hereby incorporated by reference in its entirety.

SUMMARY

One embodiment is directed to a system for operatively coupling an optical output from a light source positioned inside of a sealed housing to an external optical fiber, comprising: a first optical fiber disposed adjacent to the light source and configured to receive at least a portion of the optical output; a second optical fiber operatively coupled to the first optical fiber and configured to capture at least a portion of an output from the first optical fiber; a primary seal operatively coupled to the housing between the light source and the second optical fiber that is at least partially transparent; and a secondary seal positioned between the second optical fiber and the environment. The first optical fiber may be housed within a ferrule. The ferrule may form the primary seal. The ferrule may be housed within a connector body. The connector body may form the primary seal. The ferrule may comprise a material selected from the group consisting of: fused silica, glass, zirconia, stainless steel, titanium, brass, and copper. The connector body may comprise a material selected from the group consisting of: fused silica, glass, zirconia, stainless steel, titanium, brass, and copper. The seal may be formed by a technique selected from the group consisting of: brazing, soldering, and adhering. The primary seal may be formed by a technique selected from the group consisting of: brazing, soldering, and adhering. The primary seal may comprise an element selected from the group consisting of: a ferrule, a connector body, an optical window, and a lens. The distal surface of the first optical fiber and the proximal surface of the second optical fiber may be in physical contact. Light may be emitted from the first optical fiber and subsequently focused by a lens through the primary seal and onto the proximal face of the second optical fiber. The primary seal further may comprise a physical registration feature that mates with a complementary registration feature in a housing that contains the second optical fiber. The physical registration feature may be selected from the group consisting of: a recessed feature, and a raised feature. The second optical fiber may be housed within a ferrule. The ferrule may comprise a material selected from the group consisting of: fused silica, glass, zirconia, stainless steel, titanium, brass, and copper. A spring may be configured to push the ferrule into physical contact with the transparent region of the primary seal. The material comprising the window or lens may be selected from the group consisting of: glass, fused silica, and sapphire. A second lens subsequent to the primary seal may be configured focus light onto the proximal face of the second optical fiber. The secondary seal may comprise multiple individual axial seals along its length. Electrical connections may be made within the secondary seal. The first optical fiber may comprise a configuration selected from the group consisting of: a step index fiber, a gradient index fiber, and a hollow fiber. The second optical fiber may comprise a configuration selected from the group consisting of: a step index fiber, a gradient index fiber, and a hollow fiber. The lens used may be configured to operate at unit magnification. The second lens used may be configured to operate at unit magnification.

DETAILED DESCRIPTION

Figure 1:
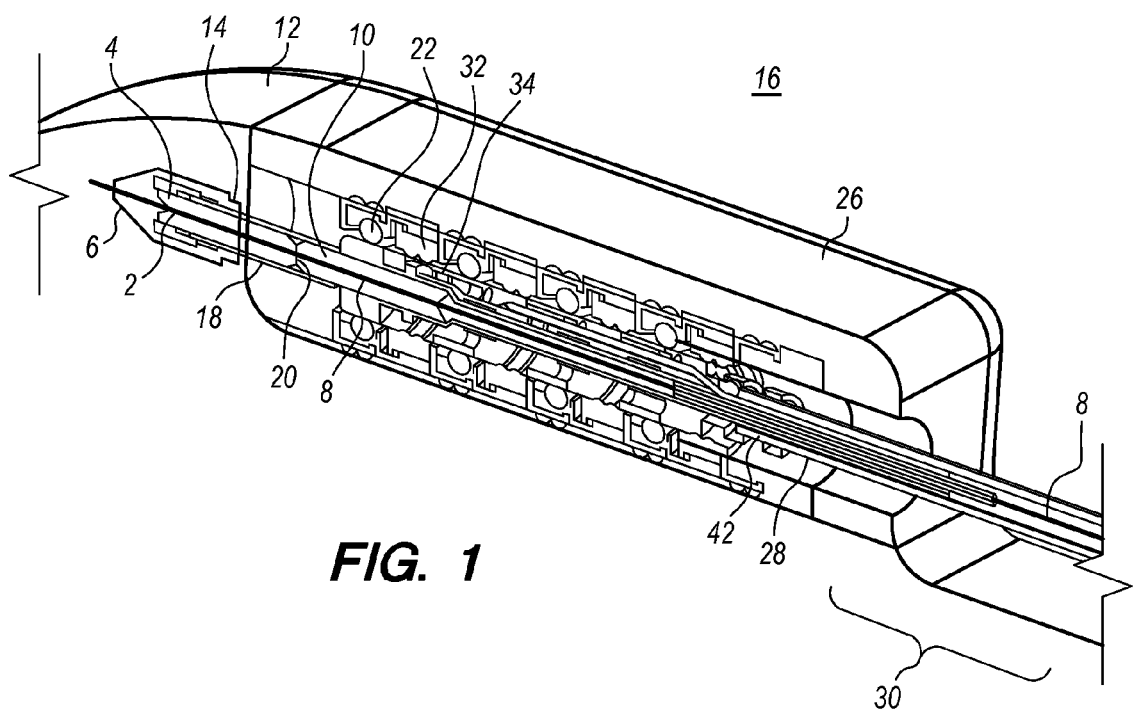
FIG. 1 depicts an embodiment of the invention directed towards use with an implantable medical system.

FIG. 1 depicts an embodiment directed at use with an implantable medical device, such that it may create a hermetic seal without damaging optical properties of fiber or light guide with temperature. Light from a light source (not shown for simplicity and clarity) may be carried via optical fiber 2. The optical fiber 2 may be coupled to ferrule 4, which may be in turn coupled to optical output module 6. As shown, optical fiber 8 is configured to be concentric with the connector body. The connector body may be comprised of a metallic, polymeric, or ceramic material such as stainless steel, polycarbonate, or similar materials.

The type of optical fiber may depend upon the character of the light being used and the nature of the therapy intended. For example, in the case of visible light illuminating a peripheral nerve or structures within the brain, 105 µm silica core diameter, 125 µm silica cladding diameter, 250 µm acrylate buffer diameter 0.22 NA step index low-OH optical fiber such as Thorlabs P/N FG105LCA, or Fiberguide P/N SFS105/125/250Y may be used for optical fiber 8. A zirconia ferrule, such as the Precision Fiber Products P/N MM-FER2030-2500 1.25 mm OD ceramic stick ferrule may be used to construct ferrule 4 and/or ferrule 10. Ferrule 4 may be brazed into optical output module 6. Leakage rates of less than $1\times10^{-7}$ cc/sec Helium at 1 atmospheric differential pressure may be achieved by utilizing Kryoflex Polycrystalline Ceramic, manufactured by SOURIAU PA&E, as a brazing compound between zirconia ferrules and metallic surfaces of optical output module 6. Alternately, the elements may be gold plated and gold brazed to create a hermetic seal. Optical output module 6 may be subsequently laser welded to housing 12 to form a hermetic seal about hermetic sealing surface 14, as shown, which may be configured to be a titanium flange.

The proximal end of optical fiber 8 may stand proud of sealing zone 16, for example, by approximately 1-4 mm. Axial alignment of optical fiber 8 to optical fiber 2 via ferrule 10 and ferrule 4, respectively, may be achieved by configuring the connector to comprise an alignment sleeve 18, which may be fabricated from zirconia to facilitate insertion, especially when ferrule 10 and ferrule 4 are also fabricated from zirconia. The wall thickness of alignment sleeve 18 may be made greater to accommodate shorter engagement lengths of the ferrules 4 & 10 while providing uniform axial force to maintain concentricity between their respective fibers. As an example, for a 3 mm exposure for both ferrules 4 & 10, which may each be comprised of the aforementioned 1.25 mm outer diameter zirconia ferrule, alignment sleeve 18 may be configured to have a wall thickness of 150 µm and a finish smooth to within 0.5 µm along the inner surface. An optical coupling interface 20 may be configured to be a physical contact coupling, such as is achieved using PC-, APC-, and UPC-types of fiber termination.

Connection between electrical connection surfaces 22 within delivery segment 24 and the electrical connections within the housing connector portion 26 of housing 12 may be configured such as those in the BalSeal Sygnus device, as is described in detail in U.S. Pat. No. 6,835,084 by Poon and Balsells, which is hereby incorporated by reference in its entirety. Housing connector portion 26 may comprise an epoxy overmould, for example, of the components described above. The electrical connections may be made of wires fabricated from stainless steel, platinum-iridium, or similar materials as described in the abovementioned reference.

The sealing of the distal seal zone 28 and boot zone 30 need not be as tight as that of the seals within the connector comprising seal 32 and sealing surface 34, and may be of greater ID than those same elements. As such, distal seal zone 28 and boot zone 30 may provide for easier insertion of sealing zone 16 of delivery segment 24 into housing connector portion 26.

Figure 2:
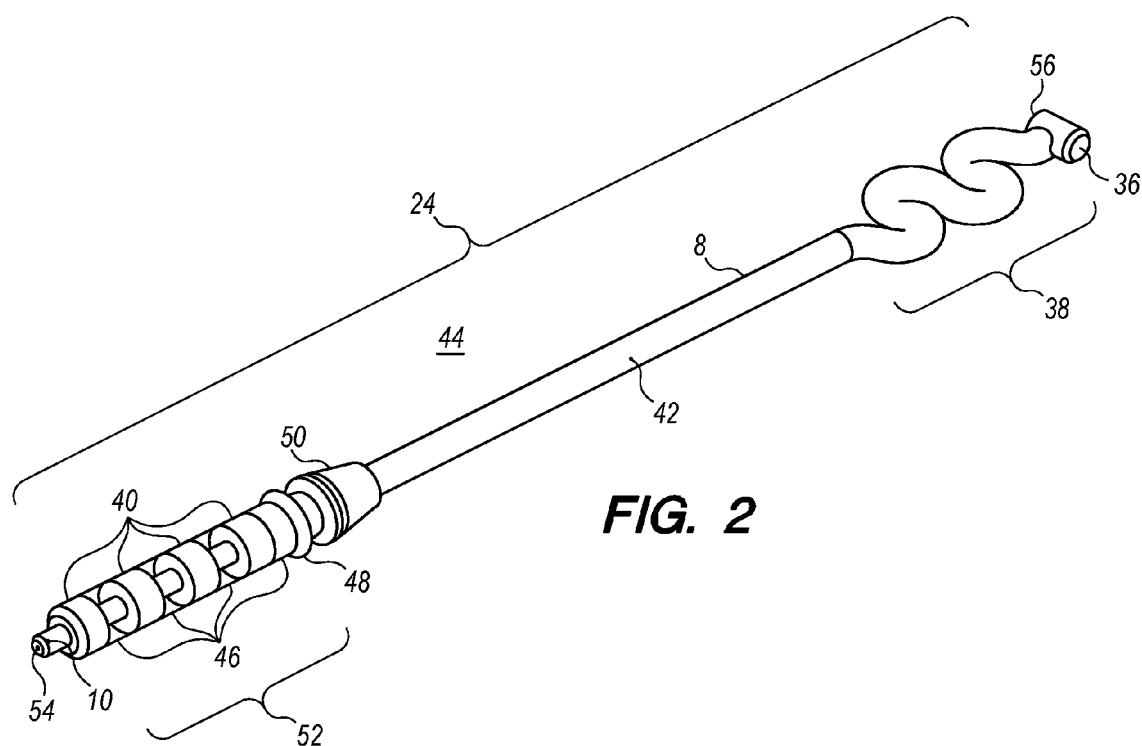
FIG. 2 depicts an embodiment of the invention directed towards complementary use with the system of FIG. 1.

FIG. 2 shows an exemplary embodiment of a delivery segment 24 configured for use with the invention, and comprising an applicator 36 operationally coupled to delivery segment 24 via undulations 38. Delivery segment 24 may further comprise an optical fiber 8 to conduct light to applicator 36 and the target tissue via applicator 36, electrical wires 44 operationally coupled to electrical contact surfaces 40, jacket 42 configured to enclose and protect electrical wires 44 and fiber 8 from the implantation environment, sealing surfaces 46, distal seal 48, and boot 50 may serve to further isolate the implantation environment from the electrical connections of electrical connection surfaces 40, and provide a means for connecting the delivery segment to a housing, not shown, utilizing sealing zone 52. Sealing zone 52 may be fabricated by moulding (or overmoulding) the entire assembly of the connector and boot 50 and incorporating the proximal end of jacket 42 such that it forms a contiguous enclosed segment. Jacket 42 may be made from a biocompatible tubing, such as, by way of nonlimiting example; polyethylene, silicone, PTFE, ePTFE, and/or PEEK. The sealing zone 52 constituting a portion of the connector may be made of similar materials. Electrical connection surfaces 40 may be made of platinum or stainless steel, for example. In the exemplary configuration shown, a 500 µm ID 700 µm OD silicone tube may serve as jacket 42, and be made to enclose as many as 19 100 µm OD electrical wires 44. The optical fiber 8 comprises a proximal end 54, and a distal end 56. The distal end of optical fiber 8 provides light to (and possibly from when optical feedback is desired) applicator 36, while the proximal end of optical fiber 8 may serve to couple light from one or more light sources to delivery segment 24.

Alternately, the applicator 36 may be eliminated to provide a delivery segment comprised of a single end-emitting optical fiber. Such a configuration may lend itself to implantation within the brain of a patient for treatment of the CNS, for example.

Figure 3:
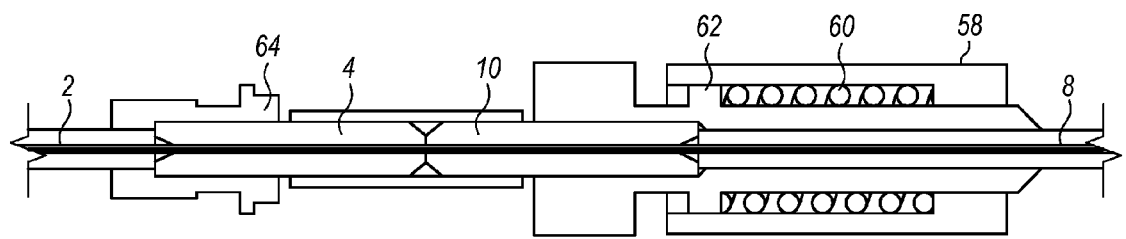
FIG. 3 depicts a further embodiment, wherein a spring force is used to keep fiber ends in contact with each other.

FIG. 3 shows an exemplary embodiment of a coupling interface configured for use with the invention, and comprising a spring-loaded ferrule used to maintain contact between the two fibers being coupled. Stainless steel may be used to construct the spring cover 58. The spring cover 58 may be retained in place within the housing connector portion, not shown, by means of a ball end spring plunger (e.g. part number 3408A65 from McMaster-Carr) or a similar feature within the housing connector portion. The spring 60 acts against the spring cover 58 and applies force against the delivery segment ferrule 10 via the delivery segment ferrule housing 62, keeping the proximal end of the optical fiber 8 in contact with the distal end of the optical fiber 2 and minimizing the amount of light/energy lost at the interface. Alternately, the spring cover 58 may not actually cover the spring 60 and instead be a simple flange that prevents the spring 60 from moving in the distal direction. In the exemplary configuration shown, a spring 60 is applying force to the delivery segment ferrule 10 via the delivery segment ferrule housing 62. An alternate embodiment may apply spring force directly to the delivery segment ferrule 10. An alternate embodiment may instead incorporate a spring 60 to apply force directly or indirectly to the light source ferrule 4, or two springs 60 may be used to apply force directly or indirectly to both ferrules 4 & 10.

Figure 4:
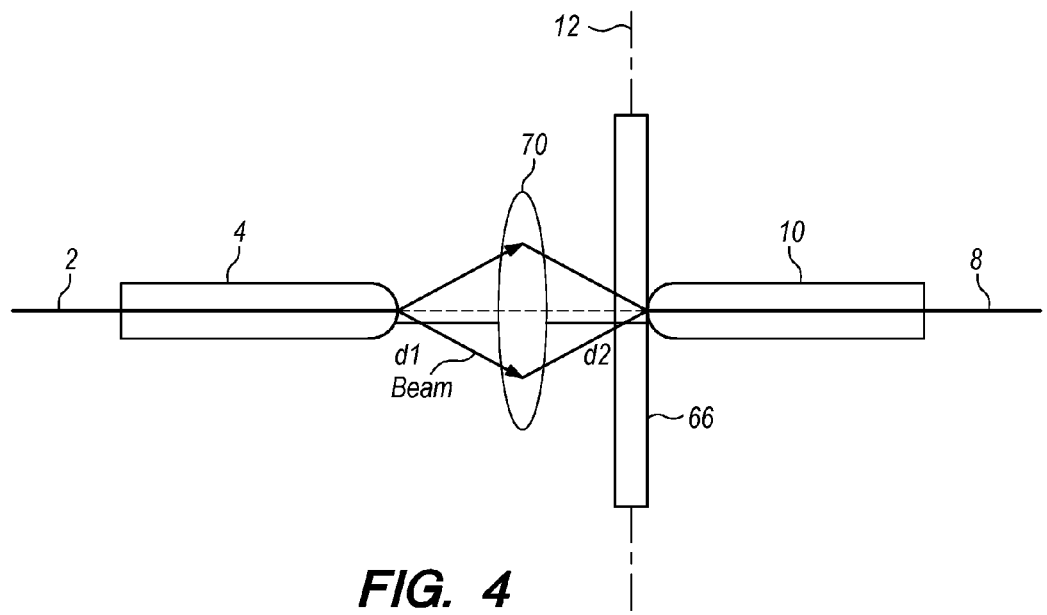
FIG. 4 depicts a further embodiment of the invention directed at the use of a focusing system for optical coupling.

As shown in the exemplary embodiment of FIG. 4, optical coupling may also be achieved using an optically powered coupling, such as reimaging the distal end of optical fiber 2 onto the proximal end of optical fiber 8 through an optical window 66. This may be achieved by substituting an optical window 66 in lieu of a ferrule to define the outside surface of housing 12 and a lens 70 such as, by way of nonlimiting example, a 1.0 mm Dia.×2.0 mm focal length planoconvex lens (e.g. P/N 65-276 from Edmund Optical) placed subsequent to distal end of optical fiber 2 and within optical output module 6 within housing 12 that serves to direct light into the proximal end of optical fiber 8, such as placing a lens 70 two focal lengths away from optical fiber 2 to operate at nominally unit magnification, wherein, distances d1 and d2 may not be equal due to the difference in optical path length introduced by the window. To relax the axial alignment constraints between optical fibers 2 & 8, optical fiber 2 may be configured to have a smaller core diameter than optical fiber 8, or, alternately, by decreasing the magnification of the optical system to create a spot nominally smaller that that of optical fiber 2 on the face of optical fiber 8. To relax the angular alignment constraints between optical fibers 2 & 8, optical fiber 2 may be configured to have a smaller numerical aperture than optical fiber 8. The size of the core for optical fiber 2 may be dictated by the brightness of the light source, not shown. By way of nonlimiting example, the window may be comprised of a 5 mm outer diameter and 1 mm thick sapphire or glass plate and its edges metallized to allow for a brazed or soldered seal to be created by the window.

Figure 5:
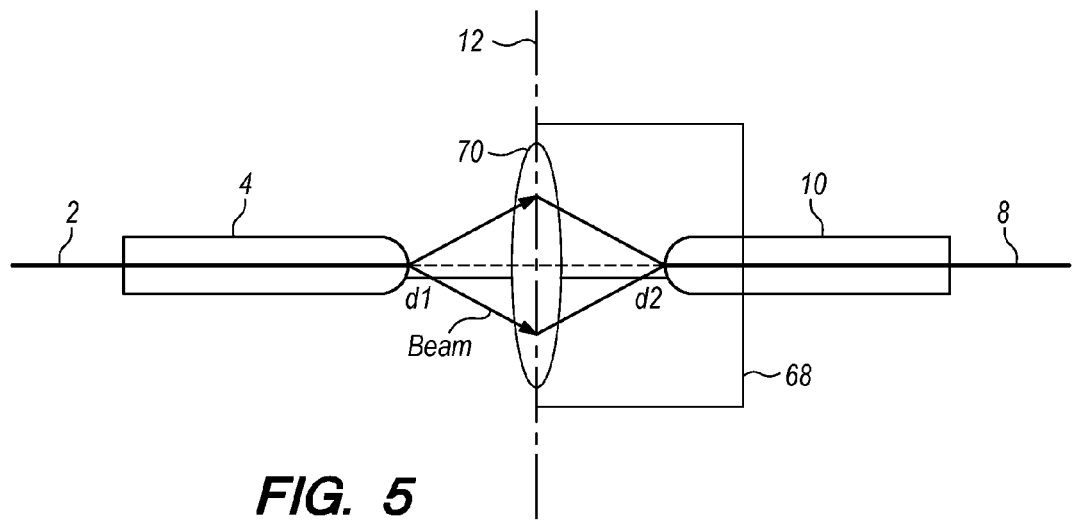
FIG. 5 depicts a further embodiment, wherein a lens is used to create a seal in the housing.

FIG. 5 shows a further embodiment, similar to that of FIG. 4, the alteration of using lens 70 to both create the seal in the housing and focus light from optical fiber 2 into optical fiber 8. A spacer 68 has been added to dispose the input end of optical fiber 8 at the correct distance from lens 70. Furthermore, alignment features on or within the housing wall may be used to dispose the input end of optical fiber 8 at the correct location.

Figure 6:
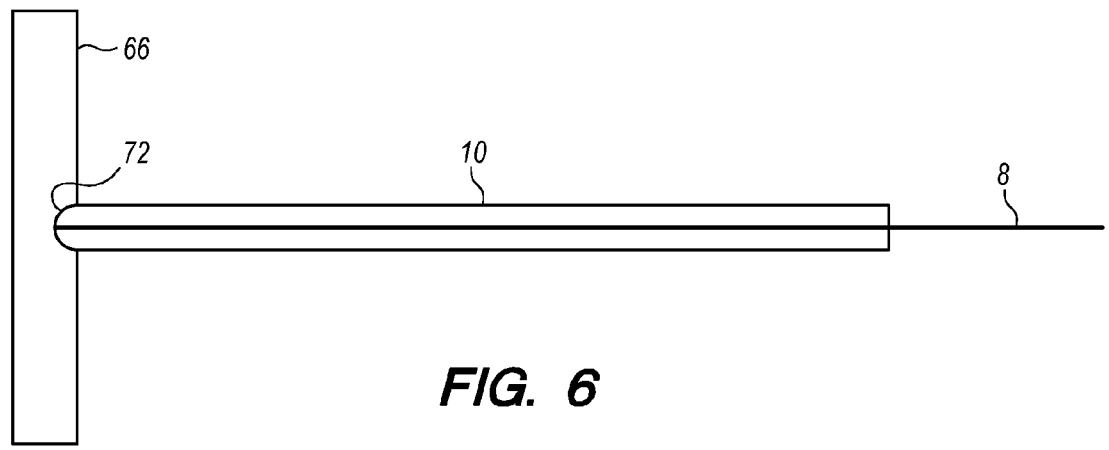
FIG. 6 depicts a further embodiment, wherein a recess in a lens or window is used to align an optical fiber.

FIG. 6 shows a further embodiment, similar to that of FIGS. 4 & 5, with the addition of physical registration feature in the form of a recess 72 in the surface of the lens or window 66 to align the optical fiber 8. The recess may be sized to accept either the proximal end of the ferrule 10 or the proximal end of the optical fiber 8 if the optical fiber 8 is not covered by the ferrule 10.

Figure 7:
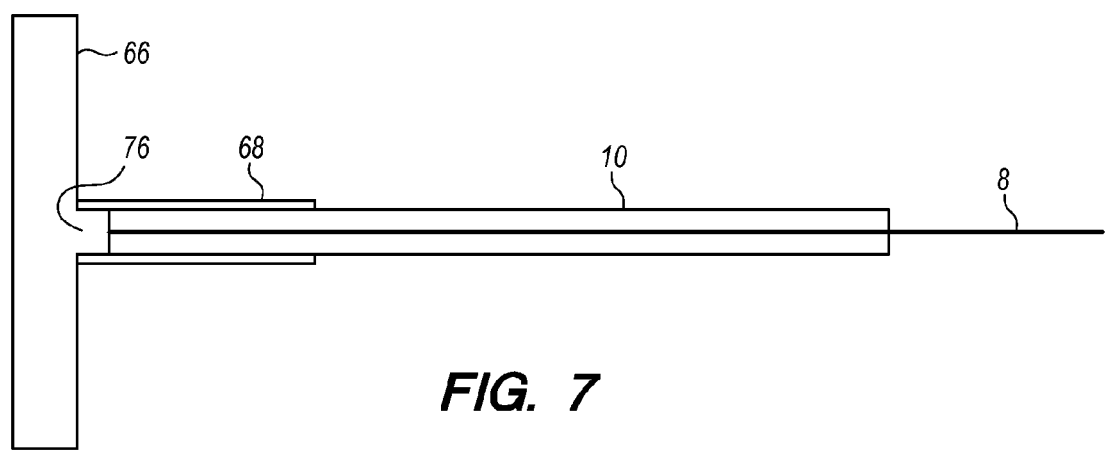
FIG. 7 depicts a further embodiment, wherein a raised feature on a lens or window is used to align an optical fiber.

In a further embodiment, similar to that of FIGS. 4 & 5, FIG. 7 shows the alteration of using a raised physical registration feature 76 on the surface of the lens or window 66 to align the optical fiber 8 by use of an alignment sleeve 68 which may fit directly over, or engage with certain mechanical aspects of, raised feature 76. The raised feature 76 and alignment sleeve 68 may be sized to be compatible with different size optical fibers 8 and/or ferrules 10, such as is done with respect to element 18 of FIG. 1.

Figure 8:
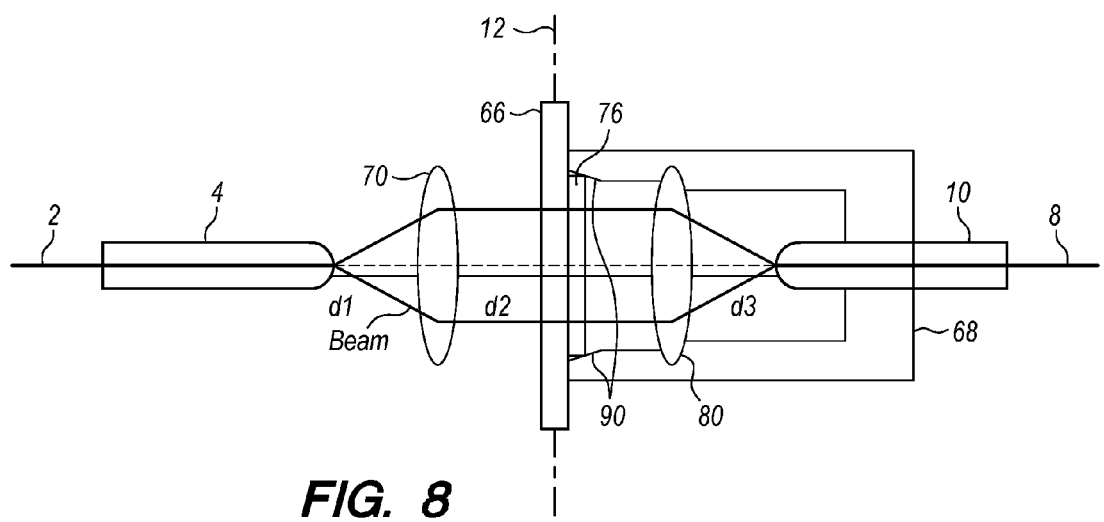
FIG. 8 depicts a further embodiment, wherein two lenses allow for variable distances between two fibers being coupled.

FIG. 8 shows a further embodiment wherein two lenses are used to produce/receive collimated light. The light exiting optical fiber 2 enters lens 78 and exits nominally collimated. The nominally collimated light then travels a distance before entering lens 80. Since the light is nominally collimated, the distance d2 between lens 78 and lens 80 may vary without critically affecting the transmission and/or optical coupling efficiency between fibers 2 and 8. After exiting lens 80, the light is focused onto the proximal end of optical fiber 8. A spacer 68 with alignment features 90 similar to those described above in FIG. 7 may be used to position the lens 80 and/or optical fiber 8 with respect to the optical output of lens 70. The distance d1 between fiber 2 and lens 70 may be the focal length of lens 70. Alignment feature 90 may be configured to engage with a raised feature 76, as was described regarding FIG. 7, and may be formed to create a frustoconical segment (as shown) that engages the edge of raised feature 76. In this collimated configuration, an angular misalignment with translate to a lateral shift in the focused spot that is proportional to the system magnification, thereby possibly providing a degree of insensitivity to such imperfections and produce a more clinically robust system. Of course, other such mating schemes are considered to be within the scope of the present invention. Spacer 68 maybe also configured such that it contains provisions to hold lens 80 and ferrule 10 within it, as shown.

Although the descriptions have been focused on embodiments for implantable photomedical devices, as they are the most strenuous, this does not preclude their use for other applications.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

Any of the devices described for carrying out the subject diagnostic or interventional procedures may be provided in packaged combination for use in executing such interventions. These supply "kits" may further include instructions for use and be packaged in sterile trays or containers as commonly employed for such purposes.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. For example, one with skill in the art will appreciate that one or more lubricious coatings (e.g., hydrophilic polymers such as polyvinylpyrrolidone-based compositions, fluoropolymers such as tetrafluoroethylene, hydrophilic gel or silicones) may be used in connection with various portions of the devices, such as relatively large interfacial surfaces of movably coupled parts, if desired, for example, to facilitate low friction manipulation or advancement of such objects relative to other portions of the instrumentation or nearby tissue structures. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. An implantable system for operatively coupling an optical output from a light source positioned inside of a sealed housing to an external optical fiber, comprising:
   a. a first optical fiber disposed adjacent to the light source, the light source configured to receive at least a portion of the optical output;
   b. a second optical fiber operatively coupled to the first optical fiber and configured to capture at least a portion of an output from the first optical fiber;
   c. a primary seal operatively coupled to the housing between the light source and the second optical fiber, the secondary optical fiber being at least partially transparent; and
   d. a secondary hermetic seal positioned between the second optical fiber and the environment.

2. The system of claim 1, wherein the first optical fiber is housed within a ferrule.

3. The system of claim 2, wherein the ferrule forms the primary seal.

4. The system of claim 2, wherein the ferrule is housed within a connector body.

5. The system of claim 4, wherein the connector body forms the primary seal.

6. The system of claim 2, wherein the ferrule comprises a material selected from the group consisting of: fused silica, glass, zirconia, stainless steel, titanium, brass, and copper.

7. The system of claim 4, wherein the connector body comprises a material selected from the group consisting of: fused silica, glass, zirconia, stainless steel, titanium, brass, and copper.

8. The system of claim 3, wherein the seal is formed by a technique selected from the group consisting of: brazing, soldering, and adhering.

9. The system of claim 5, wherein the primary seal is formed by a technique selected from the group consisting of: brazing, soldering, and adhering.

10. The system of claim 1, wherein the primary seal comprises an element selected from the group consisting of: a ferrule, a connector body, an optical window, and a lens.

11. The system of claim 10, wherein the distal surface of the first optical fiber and the proximal surface of the second optical fiber are in physical contact.

12. The system of claim 10, wherein light is emitted from the first optical fiber and subsequently focused by a lens through the primary seal and onto the proximal face of the second optical fiber.

13. The system of claim 12, wherein the primary seal further comprises a physical registration feature that mates with a complementary registration feature in a housing that contains the second optical fiber.

14. The system of claim 13, wherein the physical registration feature is selected from the group consisting of: a recessed feature, and a raised feature.

15. The system of claim 1, wherein the second optical fiber is housed within a ferrule.

16. The system of claim 15, wherein the ferrule comprises a material selected from the group consisting of: fused silica, glass, zirconia, stainless steel, titanium, brass, and copper.

17. The system of claim 15, wherein a spring is configured to push the ferrule into physical contact with the transparent region of the primary seal.

18. The system of claim 10, wherein the material comprising the window or lens is selected from the group consisting of: glass, fused silica, and sapphire.

19. The system of claim 10, wherein a second lens subsequent to the primary seal is configured focus light onto the proximal face of the second optical fiber.

20. The system of claim 1, wherein the secondary seal comprises multiple individual axial seals along its length.

21. The system of claim 20, wherein electrical connections are made within the secondary seal.

22. The system of claim 1, wherein the first optical fiber comprises a configuration selected from the group consisting of: a step index fiber, a gradient index fiber, and a hollow fiber.

23. The system of claim 1, wherein the second optical fiber comprises a configuration selected from the group consisting of: a step index fiber, a gradient index fiber, and a hollow fiber.

24. The system of claim 12, wherein the lens used operates at unit magnification.

25. The system of claim 19, wherein the second lens used operates at unit magnification.

* * * * *